(12) United States Patent
Galpin et al.

(10) Patent No.: US 12,212,771 B2
(45) Date of Patent: Jan. 28, 2025

(54) ILLUMINATION COMPENSATION FLAG IN FRAME RATE UP-CONVERSION WITH TEMPLATE MATCHING

(71) Applicant: InterDigital VC Holdings, Inc., Wilmington, DE (US)

(72) Inventors: Franck Galpin, Thorigne-Fouillard (FR); Ya Chen, Rennes (FR); Philippe Bordes, Laille (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 18/100,280

(22) Filed: Jan. 23, 2023

(65) Prior Publication Data
US 2023/0164345 A1 May 25, 2023

Related U.S. Application Data

(63) Continuation of application No. 16/964,255, filed as application No. PCT/US2019/015065 on Jan. 25, 2019, now Pat. No. 11,563,966.

(30) Foreign Application Priority Data

Jan. 26, 2018 (EP) ..................................... 18305068

(51) Int. Cl.
*H04N 19/46* (2014.01)
*H04N 19/159* (2014.01)
(Continued)

(52) U.S. Cl.
CPC ........... *H04N 19/46* (2014.11); *H04N 19/159* (2014.11); *H04N 19/176* (2014.11); *H04N 19/186* (2014.11)

(58) Field of Classification Search
CPC .. H04N 19/117; H04N 19/119; H04N 19/157; H04N 19/159; H04N 19/176;
(Continued)

(56) References Cited

U.S. PATENT DOCUMENTS 8,345,070 B2  1/2013  Suen et al.
9,870,606 B2  1/2018  Bordes et al.
(Continued)

FOREIGN PATENT DOCUMENTS

CN  104641636 A  5/2015
CN  106134191 A  11/2016
(Continued)

OTHER PUBLICATIONS

Chen et al., "Algorithm Description of Joint Exploration Test Model 3", JVET-C1001_v3, Editors, Joint Video Exploration Team (JVET) of ITU-T SG 16 WP 3 and ISO/IEC JTC 1/SC 29/WG 11, 3rd Meeting: Geneva, CH, May 26-Jun. 1, 2016, 37 pages.
(Continued)

*Primary Examiner* — Md N Haque
(74) *Attorney, Agent, or Firm* — Condo Roccia Koptiw LLP

(57) ABSTRACT

Inferring an illumination compensation flag during encoding or decoding of a video image signal using frame rate up conversion can save one bit and eliminate complexity. The illumination compensation flag can be derived from the corresponding flags of at least one bi-predictive or bi-directional prediction candidates. The flag can also be derived from some function of the flags from those candidates. Alternatively, several flags can be used for respective coding or decoding of blocks if there are more than one prediction candidate using illumination compensation.

20 Claims, 14 Drawing Sheets

(51) Int. Cl.
*H04N 19/176* (2014.01)
*H04N 19/186* (2014.01)

(58) Field of Classification Search
CPC ...... H04N 19/436; H04N 19/82; H04N 19/86; H04N 19/96
See application file for complete search history.

(56) References Cited

U.S. PATENT DOCUMENTS

| | | | |
|---|---|---|---|
| 10,182,240 | B2 | 1/2019 | Hsu |
| 10,349,083 | B2 | 7/2019 | Chen et al. |
| 2016/0021393 | A1 | 1/2016 | Zhang et al. |
| 2016/0366415 | A1* | 12/2016 | Liu .................. H04N 19/463 |
| 2016/0366416 | A1* | 12/2016 | Liu .................. G06T 7/246 |
| 2016/0366441 | A1 | 12/2016 | An et al. |
| 2017/0094305 | A1 | 3/2017 | Li et al. |
| 2017/0339405 | A1* | 11/2017 | Wang ............... H04N 19/593 |
| 2018/0077417 | A1* | 3/2018 | Huang ............... H04N 19/70 |
| 2018/0098072 | A1* | 4/2018 | Zhang ............... H04N 19/426 |
| 2018/0098086 | A1* | 4/2018 | Chuang ............. H04N 19/186 |
| 2018/0098087 | A1* | 4/2018 | Li .................. H04N 19/132 |
| 2018/0184083 | A1* | 6/2018 | Panusopone ......... H04N 19/107 |
| 2018/0270500 | A1* | 9/2018 | Li .................. H04N 19/52 |

FOREIGN PATENT DOCUMENTS

| | | |
|---|---|---|
| CN | 107113424 A | 8/2017 |
| CN | 107147911 A | 9/2017 |
| CN | 107172426 A | 9/2017 |
| KR | 101431046 B1 | 8/2014 |
| WO | 2009/002092 A2 | 12/2008 |
| WO | 2014/166104 A1 | 10/2014 |
| WO | 2016/200777 A1 | 12/2016 |
| WO | 2017/197146 A1 | 11/2017 |

OTHER PUBLICATIONS

Chen et al., "Algorithm Description of Joint Exploration Test Model 7 (JEM 7)", Editors, JVET-G1001-V1, Joint Video Exploration Team (JVET) of ITU-T SG 16 WP 3 and ISO/IEC JTC 1/SC 29/WG 11, 7th Meeting: Torino, IT, Jul. 13-21, 2017, 50 pages.

Hur et al., "Adaptive Local Illumination Change Compensation Method for H.264/AVC-Based Multiview Video Coding", IEEE Transactions on Circuits and Systems for Video Technology, vol. 17, No. 11, Nov. 2007, pp. 1496-1505.

ITU-T, "High Efficiency Video Coding", Recommendation ITU-T H.265, Series H: Audiovisual and Multimedia Systems, Infrastructure of Audiovisual Services—Coding of Moving Video, Apr. 2015, 636 pages.

Lin et al., "Enhanced Template Matching in FRUC Mode", JVET-E0035_v1, Joint Video Exploration Team (JVET), of ITU-T SG 16 WP 3 and ISO/IEC JTC 1/SC 29/WG 115th Meeting: Geneva, CH, Jan. 12-20, 2017.

Liu et al., "Local Illumination Compensation", VCEG-AZ06, Qualcomm Incorporated, ITU—Telecommunications Standardization Sector Study Group 16 Question 6 Video Coding Experts Group (VCEG), 52nd Meeting, Warsaw, Poland, Jun. 19-26, 2015, 5 pages.

Chen et al., "Algorithm Description of Joint Exploration Test Model 7 (JEM 7)", JVET-G1001-V1, Editors, Joint Video Exploration Team (JVET) of ITU-T SG 16 WP 3 and ISO/IEC JTC 1/SC 29/WG 11, 7th Meeting: Torino, IT, Jul. 13-21, 2017, 48 pages.

\* cited by examiner

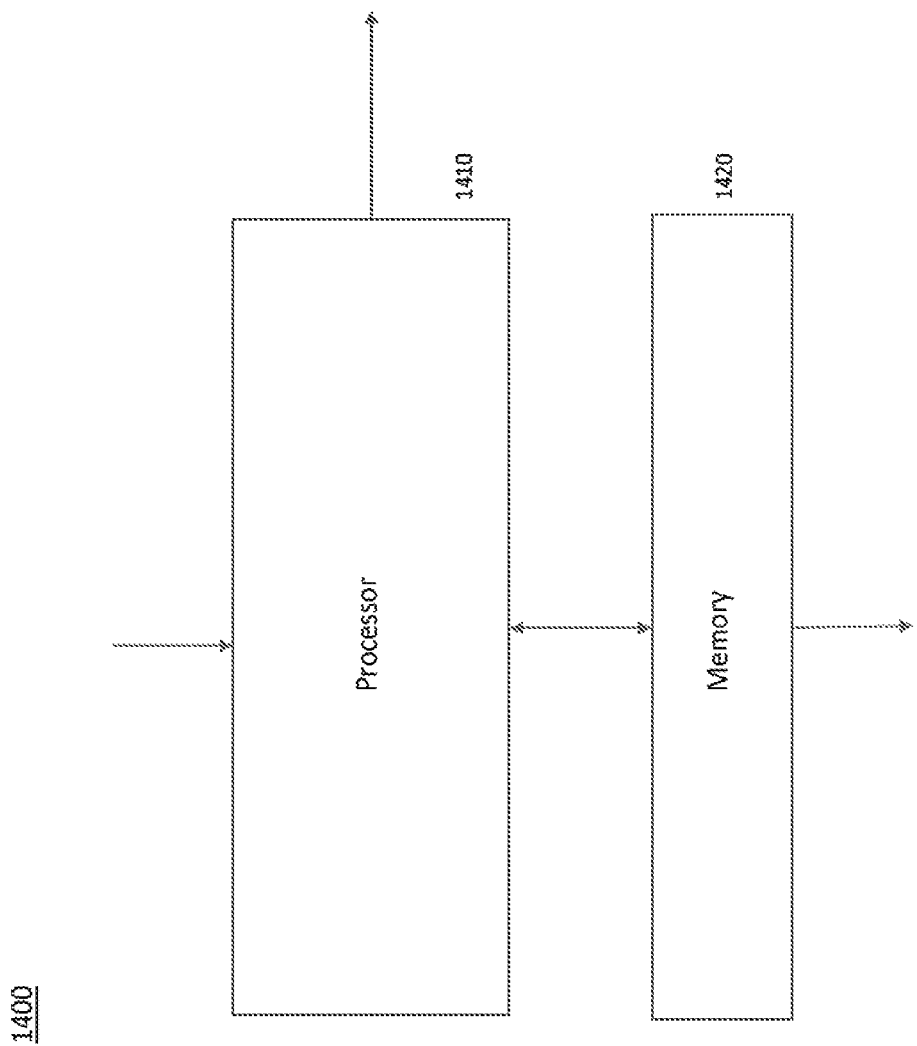

ILLUMINATION COMPENSATION FLAG IN FRAME RATE UP-CONVERSION WITH TEMPLATE MATCHING

CROSS REFERENCE TO RELATED APPLICATIONS

This application is a Continuation Application of U.S. Non-Provisional application Ser. No. 16/964,255, filed Jul. 23, 2020; which is the National Stage Entry under 35 U.S.C. § 371 of Patent Cooperation Treaty Application No. PCT/US2019/015065, filed Jan. 25, 2019, which claims priority from European Application No. 18305068.1, filed Jan. 26, 2018, the contents of which are hereby incorporated by reference herein.

FIELD OF THE INVENTION

The present principles relate to video compression and more particularly to performing video coding and decoding.

BACKGROUND OF THE INVENTION

Many attempts have been made to improve the coding efficiency of block-based codecs. Frame Rate Up-Conversion (FRUC) is a tool that allows derivation of motion vector predictors without any information, i.e. without supplemental syntax. The FRUC process is completely symmetric, in that the same operations are performed at the decoding side as at the encoding side.

This tool can only be fully on or off with one flag (as shown in Table 2) while it uses several sub-tools:

AMVP (Advanced Motion Vector Prediction) blocks use one template matching cost function, and no signaling.

Merge blocks can use a sub-part refinement with the same process, with two different template matching cost functions, and with some signaling (off/on Template/Bilateral).

Overall performances of the FRUC tool as well as of the different sub-tools over the Joint Exploration Model 4 (JEM 4) of the Joint Video Exploration Team (ITU-T VCEG (Q6/16) and ISO/IEC MPEG (JTC 1/SC 29/WG 11) are provided in Table 1.

TABLE 1

Performances of the FRUC tools and sub-tools over the JEM4 [2]

| | Over HM-16.6-JEM-4.0 (parallel) | | | | |
|---|---|---|---|---|---|
| | Y | U | V | EncT | DecT |
| Random Access Main 10 | | | | | |
| FRUC | −3.60% | −3.72% | −3.92% | 139% | 142% |
| AMVP | −0.85% | −0.77% | −0.85% | 107% | 110% |
| Merge | −2.85% | −3.13% | −3.33% | 128% | 133% |
| Sub-part | −0.43% | −0.52% | −0.59% | 109% | 118% |
| Bilateral | −1.16% | −1.35% | −1.44% | 116% | 115% |
| Low delay B Main 10 | | | | | |
| FRUC | −2.41% | −3.28% | −3.39% | 161% | 162% |
| AMVP | −0.41% | 0.17% | −0.28% | 113% | 116% |
| Merge | −2.09% | −3.65% | −3.79% | 132% | 136% |
| Sub-part | −0.48% | −0.99% | −0.79% | 114% | 117% |
| Bilateral | −1.03% | −2.06% | −2.10% | 120% | 120% |
| Low delay P Main 10 | | | | | |
| FRUC | −1.38% | −1.33% | −1.53% | 128% | 119% |
| AMVP | −0.16% | −0.12% | −0.45% | 115% | 109% |
| Merge | −1.27% | −1.48% | −1.32% | 114% | 109% |
| Sub-part | −0.21% | −0.42% | −0.45% | 104% | 104% |
| Bilateral | 0.00% | 0.00% | 0.00% | 106% | 100% |

Moreover, several of these sub-tools use parameters. Some of them are already in the syntax as shown in Table 2, but the others are absent.

In Table 2, sps_use_FRUC_mode is the on/off flag for the whole FRUC tool, FRUC_refine_flter allows changing the sub-pel interpolation filter, FRUC_refine_range_in_pel defines the maximum integer pel range for refinement, and FRUC_small_blk_refine_depth the maximum depth for sub-parts of FRUC Merge blocks (i.e. their minimum size).

TABLE 2

SPS syntax of the current FRUC tool

```
...
sps_use_FRUC_mode                    u(1)
if( sps_use_FRUC_mode ) {
    FRUC_refine_filter               ue(v)
    FRUC_refine_range_in_pel         ue(v)
    FRUC_small_blk_refine_depth      ue(v)
}
```

SUMMARY OF THE INVENTION

These and other drawbacks and disadvantages of the prior art are addressed by the present described embodiments, which are directed to a method and apparatus to manage a trade-off between the coding efficiency provided by FRUC tools and its complexity.

According to an aspect of the described embodiments, there is provided a method. The method comprises steps for determining whether a FRUC prediction candidate of a video coding block corresponds to bi-direction temporal or bi-predictive candidates; setting at least one illumination compensation flag based on illumination compensation flags of at least one of the bi-direction temporal or bi-predictive candidates when the FRUC prediction candidate corresponds to the bi-direction temporal or bi-predictive candidates; and, encoding said video coding block based on said at least one illumination compensation flag.

According to another aspect of the described embodiments, there is provided a second method. The method comprises steps for determining whether a FRUC prediction candidate of a video coding block corresponds to bi-direction temporal or bi-predictive candidates; setting at least one illumination compensation flag based on illumination compensation flags of at least one of the bi-direction temporal or bi-predictive candidates when the FRUC prediction candidate corresponds to the bi-direction temporal or bi-predictive candidates; and, decoding said video coding block based on said at least one illumination compensation flag.

According to another aspect of the described embodiments, there is provided an apparatus. The apparatus comprises a memory and a processor. The processor can be configured to encode a portion of a video signal by determining whether a FRUC prediction candidate of a video coding block corresponds to bi-direction temporal or bi-predictive candidates; setting at least one illumination compensation flag based on illumination compensation flags of at least one of the bi-direction temporal or bi-predictive candidates when the FRUC prediction candidate corresponds to the bi-direction temporal or bi-predictive candidates; and, encoding said video coding block based on said at least one illumination compensation flag.

According to another aspect of the described embodiments, there is provided another apparatus. The apparatus comprises a memory and a processor. The processor can be configured to decode a portion of a video signal by determining whether a FRUC prediction candidate of a video coding block corresponds to bi-direction temporal or bi-predictive candidates; setting at least one illumination compensation flag based on illumination compensation flags of at least one of the bi-direction temporal or bi-predictive candidates when the FRUC prediction candidate corresponds to the bi-direction temporal or bi-predictive candidates; and, decoding said video coding block based on said at least one illumination compensation flag.

According to another aspect of the described embodiments, there is provided a third and fourth method for encoding and decoding, respectively. The method comprises steps for determining whether a FRUC prediction candidate of a video coding block corresponds to bi-direction temporal or bi-predictive candidates; setting at least one illumination compensation flag based on a function of illumination compensation flags of at least one of the bi-direction temporal or bi-predictive candidates when the FRUC prediction candidate corresponds to the bi-direction temporal or bi-predictive candidates; and, encoding or decoding said video coding block based on said at least one illumination compensation flag.

These and other aspects, features and advantages of the present principles will become apparent from the following detailed description of exemplary embodiments, which is to be read in connection with the accompanying drawings.

BRIEF DESCRIPTION OF THE DRAWINGS

FIG. 14 illustrates one embodiment of an apparatus for encoding or decoding video using at least one inferred illumination compensation flag.

DETAILED DESCRIPTION

Figure 1:
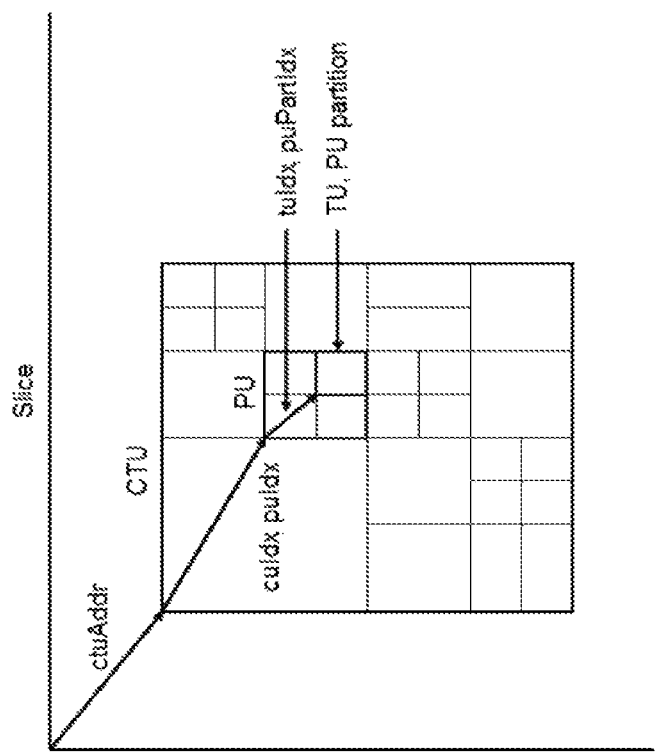
FIG. 1 illustrates division of a Coding Tree Unit into Coding Units. Prediction Units and Transform Units.

The domain of the embodiments described herein is video compression, intended to improve the video compression efficiency of state of the art video coding schemes.

An exemplary coding tool recently introduced in the Joint Exploration Model (JEM) is called FRUC (Frame Rate Up Conversion), or also pattern matched motion derivation, and aims at decoder side motion block-based motion vector predictor derivation.

The Frame Rate Up-Conversion (FRUC) tool aims at finding the best motion vector predictor (MVP) among a set of candidates with respect to a template matching cost. The best identified candidate is then refined towards the minimum template matching cost.

The FRUC processes are similar for every type of block: one process is performed for the whole block then, for some particular blocks, a second process on sub-parts can also be achieved. The main difference between these processes is the initial list of candidates and the available template matching cost functions.

In order to manage the trade-off between the performances of this FRUC tool and its complexity, it is possible to inform the decoder of which FRUC processes (or sub-processes, i.e. parts of processes) are allowed or not.

One problem solved by the described embodiments is how to efficiently modify the IC flag decision rules for FRUC using template matching, in a way that provides good compression efficiency (rate distortion performance) together with a minimum complexity increase of the coding design; or conversely, significant complexity decrement with a minimum loss of performance.

The FRUC tool is applied to all blocks (Merge and AMVP) and refined at a sub-part, or a sub-block, level of Merge blocks. For AMVP blocks, only one template matching cost function is available, "Template". For Merge blocks and their sub-parts, two different template matching cost functions are tested, "Template" and "Bilateral".

Template matching derives motion information of a current coding unit by finding the best match between a template (the top and/or left neighboring blocks of a current coding unit) in a current picture and a block, having same size as the template, in a reference picture.

Bilateral matching derives motion information of the current coding unit by finding the best match between two blocks along the motion trajectory of the current coding unit in two reference pictures.

The sub-parts of Merge blocks are sub-blocks. In FRUC Merge, the FRUC tool is applied firstly at the CU (Coding Unit) level, then this CU is divided into sub-blocks and the FRUC tool is applied again for each of the sub-blocks with the same template matching cost functions as for the CU.

The described embodiments are in the field of video compression, in particular it aims at improving compression efficiency compared to existing video compression systems.

The present embodiments propose an adaptation of block-based local Illumination Compensation (IC) flag, when template matching cost is used to derive motion information in FRUC (Frame Rate Up-Conversion) mode.

In the HEVC video compression standard, a picture is divided into so-called Coding Tree Units (CTU), which size is typically 64×64, 128×128, or 256×256 pixels. Each CTU is represented by a Coding Unit (CU) in the compressed domain. Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level.

In Inter coding mode, motion compensated temporal prediction is employed to exploit the redundancy that exists between successive pictures of a video. To do it, exactly one motion vector (MV) is assigned to each PU in HEVC. Therefore, in HEVC, the motion model that links a PU and its reference block simply consists in a translation.

In the Joint Exploration Model (JEM) developed by the JVET (Joint Video Exploration Team) group, a CU is no more divided into PU or TU, and some motion information (prediction information in inter mode) is directly assigned to each CU. Additionally, some richer motion models are supported to improve temporal prediction. One of the new motion models introduced in the JEM is the FRUC (Frame Rate Up-Conversion) which selects the best motion vector predictor between several candidates using a matching cost function, and then refines it towards the minimum matching cost.

FRUC mode is signaled at the CU level with a FRUC flag and an additional FRUC mode flag to indicate which matching cost function (bilateral, template or affine template) is to be used to derive motion information for the CU. At encoder side, the decision on whether using FRUC merge mode for a CU is based on RD cost selection. The three matching modes (bilateral, template or affine template) are checked for a CU. The one leading to the minimal RD cost is further compared to other coding modes. If the FRUC mode is the most efficient one, the FRUC flag is set to true for the CU and the related matching mode is used.

FRUC allows deriving motion information of a CU at decoder side without signaling. Motion derivation process in FRUC merge mode has two steps. A CU-level motion search is first performed, then followed by a Sub-CU level motion refinement. At CU level, an initial motion vector is derived from a list of MV candidates for the whole CU based on bilateral or template matching. The candidate leading to the minimum matching cost is selected as the starting point for further CU level motion refinement. Then a local search based on bilateral or template matching around the starting point is performed and the MV resulting in the minimum matching cost is taken as the MV for the whole CU.

Figure 2:
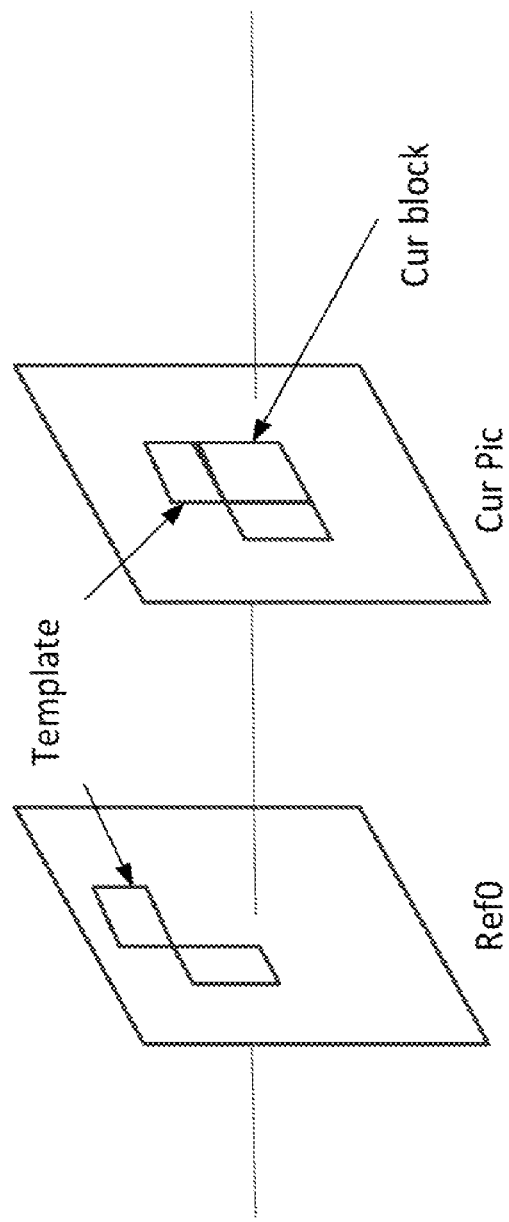
FIG. 2 illustrates a template matching cost function.

As shown in FIG. 2, template matching cost function is used to derive motion information of the current CU by finding the best match between a template (top and/or left neighboring blocks of the current CU, also known as L-shape) in the current picture and a block (same size to the template) in a reference picture.

Block-based local Illumination Compensation (IC) [3] can also be applied in JEM, which allows correcting block prediction samples obtained via Motion Compensated (MC) by considering the spatial or temporal local illumination variation possibly. For each inter-mode coded CU, an IC flag is signaled or implicitly derived to indicate the usage of IC. The IC tool is based on a linear model for illumination changes, using a scaling factor a and an offset b, which are called IC parameters.

Figure 3:
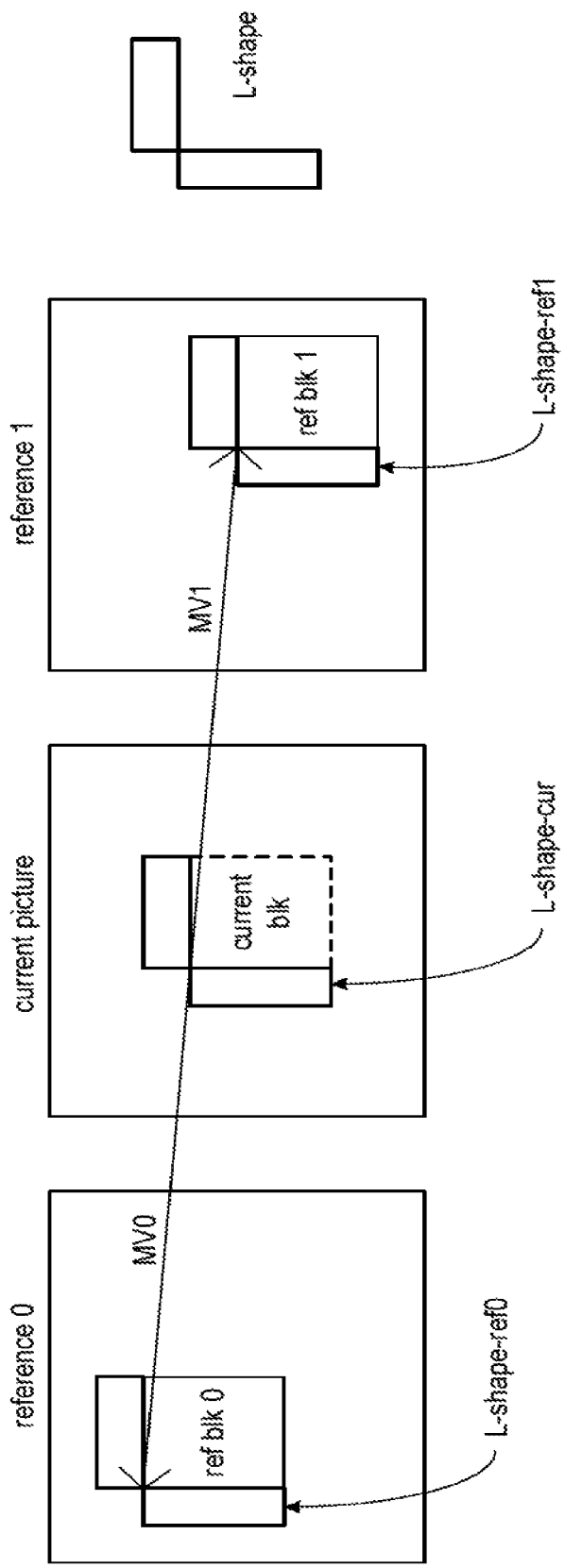
FIG. 3 illustrates L-shapes in references 0 and 1 are compared to the current block L-shape to derive the IC parameters.
Figure 4:
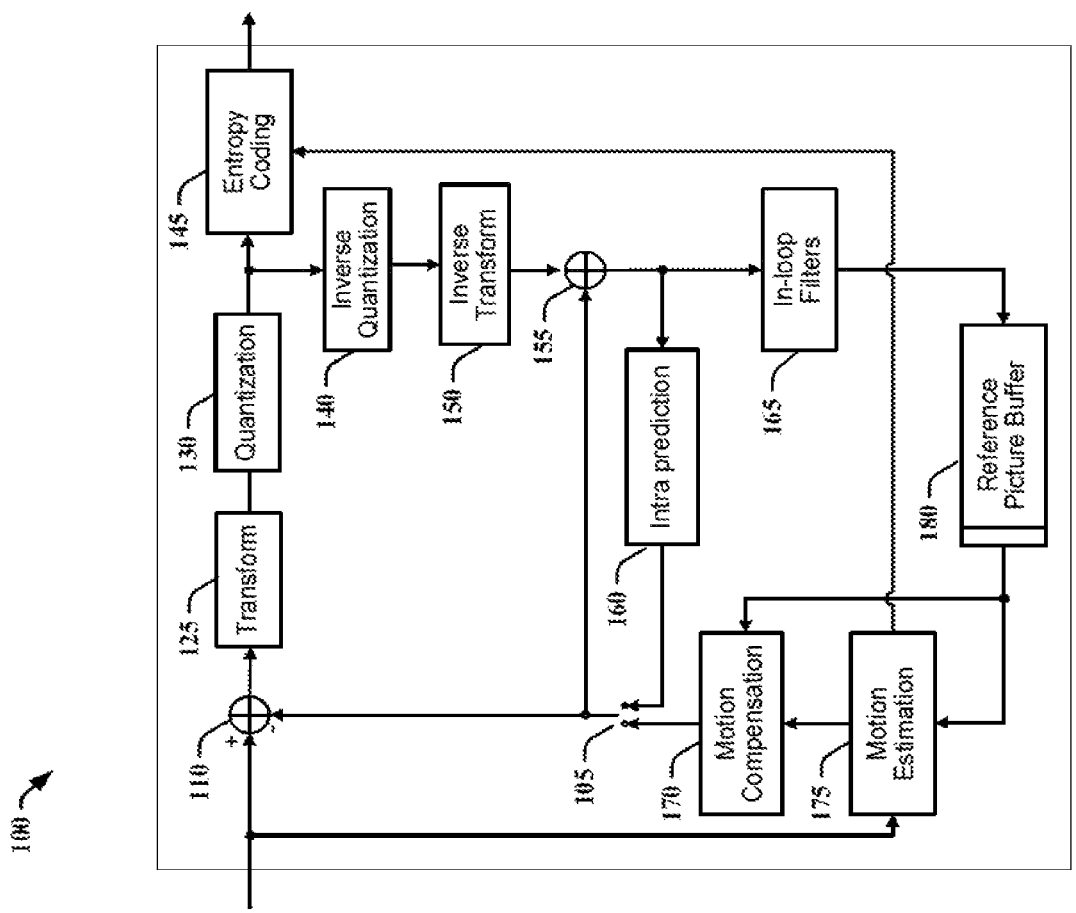
FIG. 4 illustrates a generic video compression scheme.
Figure 5:
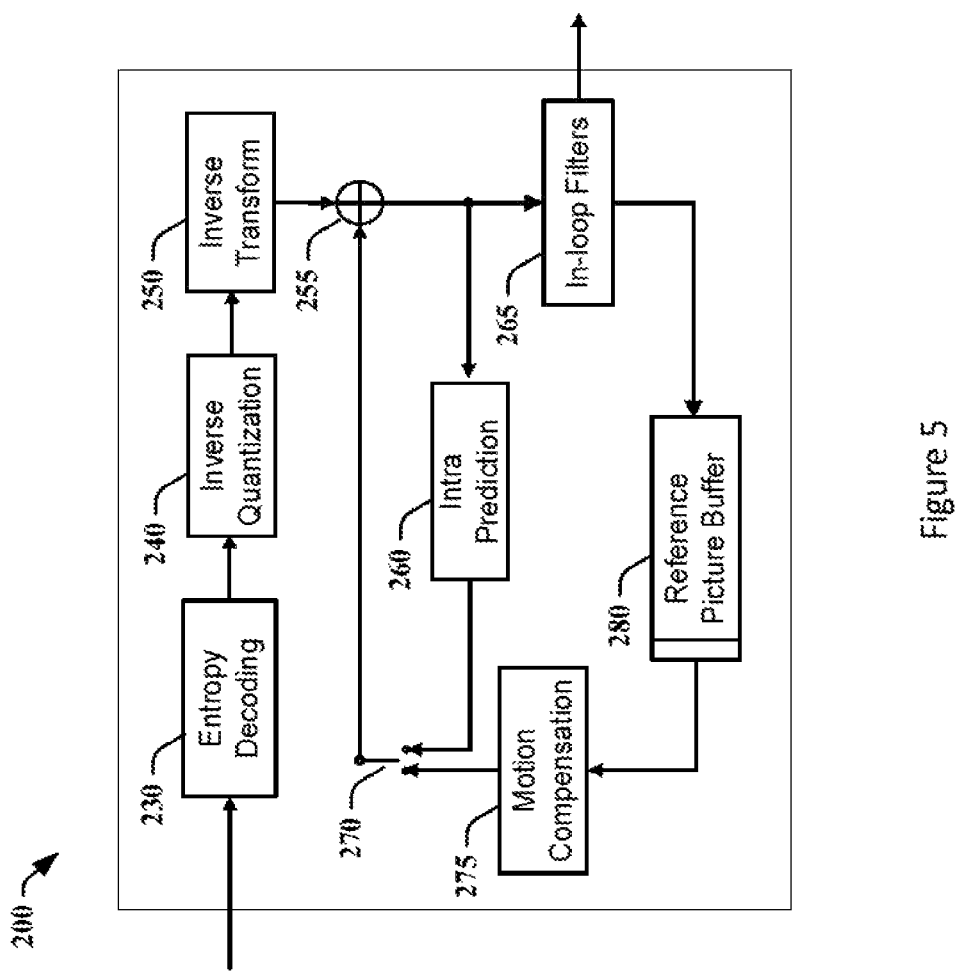
FIG. 5 illustrates a generic video decompression scheme.

When a CU is coded with merge mode, the IC flag is copied from neighboring blocks, in a way similar to motion information copy in merge mode; otherwise, an IC flag is signaled for the CU to indicate whether IC applies or not. When the IC flag is true, IC parameters of a CU are derived at decoder side without signaling. These parameters are determined by comparing reconstructed neighboring samples of the current CU (L-shape-cur) with neighboring samples (L-shape-ref-i) of the corresponding reference-i block (i=0 or 1) as depicted in FIG. 3. IC parameters are selected by minimizing the difference between the samples in the L-shape-cur and the samples of the L-shape-ref-i.

To reduce the encoding complexity, IC tool can be disabled for the entire picture, for example when there is no obvious illumination change between a current picture and its reference pictures. To identify this situation, histograms of a current picture and every reference picture of the current picture can be calculated at the encoder. If the histogram difference between the current picture and every reference picture of the current picture is smaller than a given threshold, IC is disabled for the current picture; otherwise, IC is enabled for the current picture.

The described embodiments concern the modification of the decision of the IC flag, in particular for the FRUC mode using the template matching. The proposed IC flag for FRUC with the template matching is derived from neighboring blocks, instead of signaling it.

As described earlier, in a prior approach, a one-bit IC flag is signaled for the inter-mode coded CU which uses FRUC mode to process the inter prediction and also to apply a template matching cost function to derive motion information for this CU.

The described embodiments derive the IC flag of a CU directly from the neighboring blocks, when coding a current CU in FRUC mode with the template matching.

These embodiments include:
Infer the IC flag from the FRUC merge candidates. For temporal merge candidate, several policies for generating IC flag in bi-prediction case are proposed; for combined bi-predictive candidate, several policies for generating IC flag in bi-prediction are proposed. [encoder/decoder]

When bi-direction for motion compensation is applied, several policies for inferring the IC flag from the two reference lists are proposed. [encoder/decoder]

When bi-direction for motion compensation is applied, selection between using the inferred IC flag of the current CU or applying the IC flag of each motion vector predictor (MVP) respectively is proposed. [encoder/decoder]

By generating the IC flag in this way, there is no need to spend one bit signaling IC flag for such inter-mode coded CU, which implies that some potential rate costs can be saved. Another advantage of these embodiments is that the encoder loop for testing whether the IC tool is enabled or disabled for such CU will be removed, therefore the complexity can be reduced.

The following sections explain the proposed embodiments in detail. It is organized as follows. First a prior approach used to generate the IC flag of an inter-mode coded CU is described. Then, different embodiments for new rules of IC flag derivation of the CU in FRUC mode with the template matching are presented. At last, some variants of the proposed embodiments are proposed.

Figure 6:
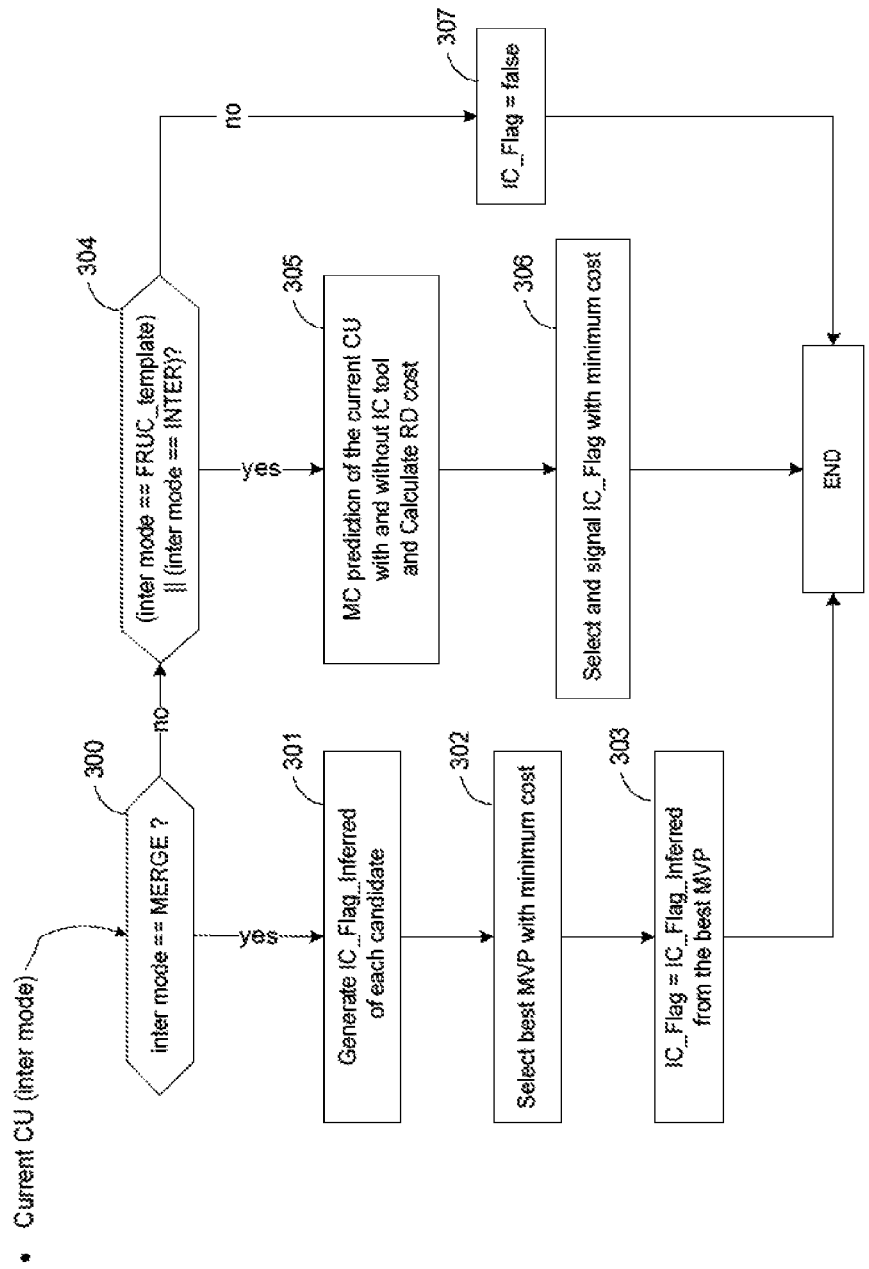
FIG. 6 illustrates a prior art overall encoder process for deriving the IC flag of an inter-mode coded CU.

One proposed prior art overall encoder process to decide the IC flag of an inter-mode coded CU when IC tool is enabled for the current picture is depicted in FIG. 6. It consists in the following.

The input to the process is the current CU for which one wants to decide the IC flag. The IC flag derivation rule is decided according to the inter mode used for encoding the current CU at step S300 and S304.

Figure 7:
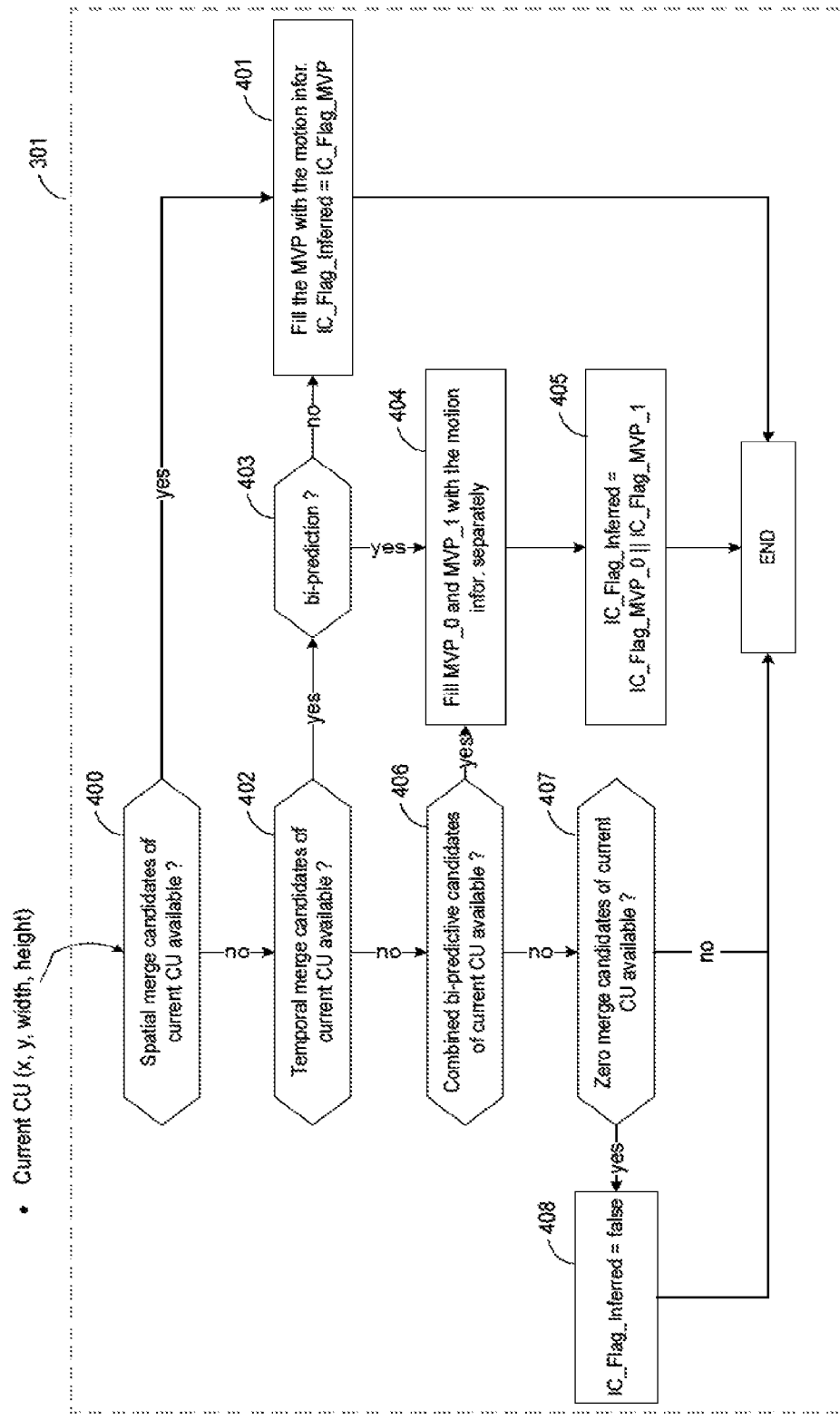
FIG. 7 illustrates a prior art process for filling Motion Vector Prediction (MVP) information from the merge candidates of the CU with MERGE mode.

Next, when the current CU is coded with MERGE mode, the IC flag is copied from the motion vector predictor (MVP) of its neighboring blocks. At step 301, the derivation of the IC flag in merge candidate is presented in FIG. 7. For each merge candidate, besides motion information (motion vector and reference index etc.), one IC flag is also generated, following the rules listed below:

For a spatial merge candidate at step S400, its IC flag is set equal to that of the corresponding spatial neighboring block at step S401.

For temporal merge candidate at step S402, its IC flag is set equal to that of the corresponding temporal co-located block at step S401. For bi-prediction case at step S403, motion information may be derived from two different temporal co-located blocks at step S404. In this case, IC flag of temporal merge candidate is set to true if at least one of the two co-located blocks uses IC and set to false otherwise at step S405.

For combined bi-predictive candidate at step S406, it is generated from two spatial/temporal merge candidates at step S404, and its IC flag is set to true if IC flag of at least one of the two source candidates is true and set to false otherwise at step S405.

For the tailing zero merge candidates at step S407, IC flag is always set to false at step S408.

After selecting the best motion vector predictor between several merge candidates towards the minimum cost at step S302, the current CU directly copy the IC flag of this best motion vector predictor at step S303.

When a CU is encoded using INTER mode or FRUC mode with the template matching, this CU performs motion estimation and motion compensation with and without applying IC tool at step S305. The best coding way to encode the current CU, i.e. with minimum rate distortion cost, is then selected, which is signaled by one IC flag at step S306.

For other remaining inter modes, IC flag is set to false at step S307. Several cases about encoding the CU with affine model in the JEM are (i) affine merge mode, (ii) affine template matching for a CU in FRUC mode, and (iii) affine inter mode for a CU in AMVP (Advanced Motion Vector Prediction) mode. As for a CU in FRUC mode with the bilateral matching, its IC flag is also set to false.

With the prior-art signaling or inferring method of IC flag described above, a main limitation is that the IC flag in FRUC mode (also INTER mode) is not inferred but explicitly coded. This might decrease the performance by adding information to encode. Moreover, to select the optimal IC flag to signal, an IC flag loop search in FRUC mode with the template matching is activated, which also increases the encoder complexity.

Figure 8:
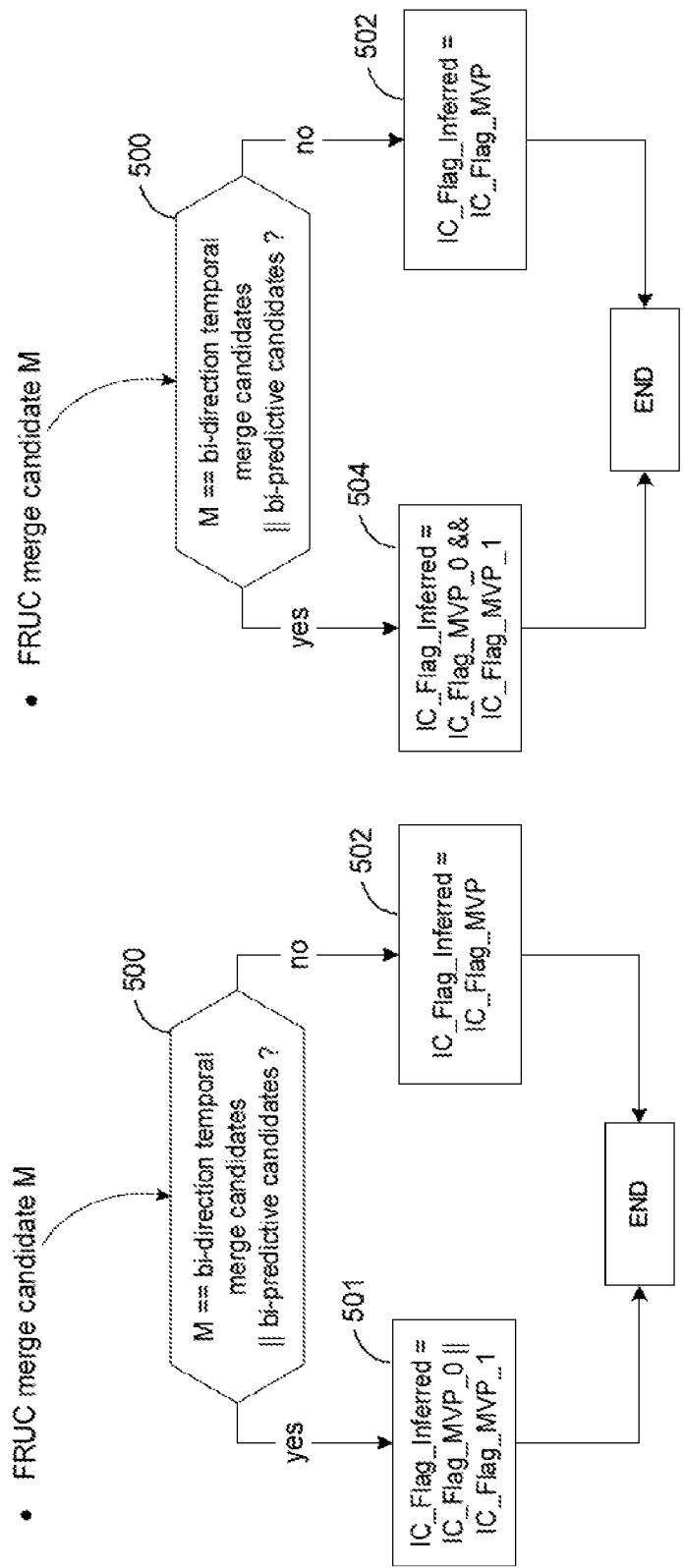
FIG. 8 illustrates IC flag derivation from the merge candidates of the CU with FRUC template matching mode (Left: OR policy; Right: AND policy).

To solve the issue mentioned above, the first embodiment proposes to infer the IC flag of the current CU from neighboring MVPs when the FRUC template matching mode is used. The concept is similar to the inferring algorithm of the IC flag in the MERGE mode. The implementation of the proposed IC flag for FRUC template matching mode is shown in FIG. 8. At step S500, evaluate if the FRUC merge candidate M corresponds to the bi-directional/bi-predictive candidates or not. If M is one of these merge candidates, the inferred IC flag is set to true if the IC flag of at least one of the two source candidates is true and set to false otherwise at step S501 (namely OR policy). If only one source candidate is available, the inferred IC flag is copied directly from its candidate at step S502.

According to a variant of this first embodiment, the proposed IC flag derivation from two different merge candidates available can also be the AND policy as shown in the right side of FIG. 8. The inferred IC flag is set to true only if both the IC flags of the two source candidates are true and set to false otherwise at step S504.

Figure 9:
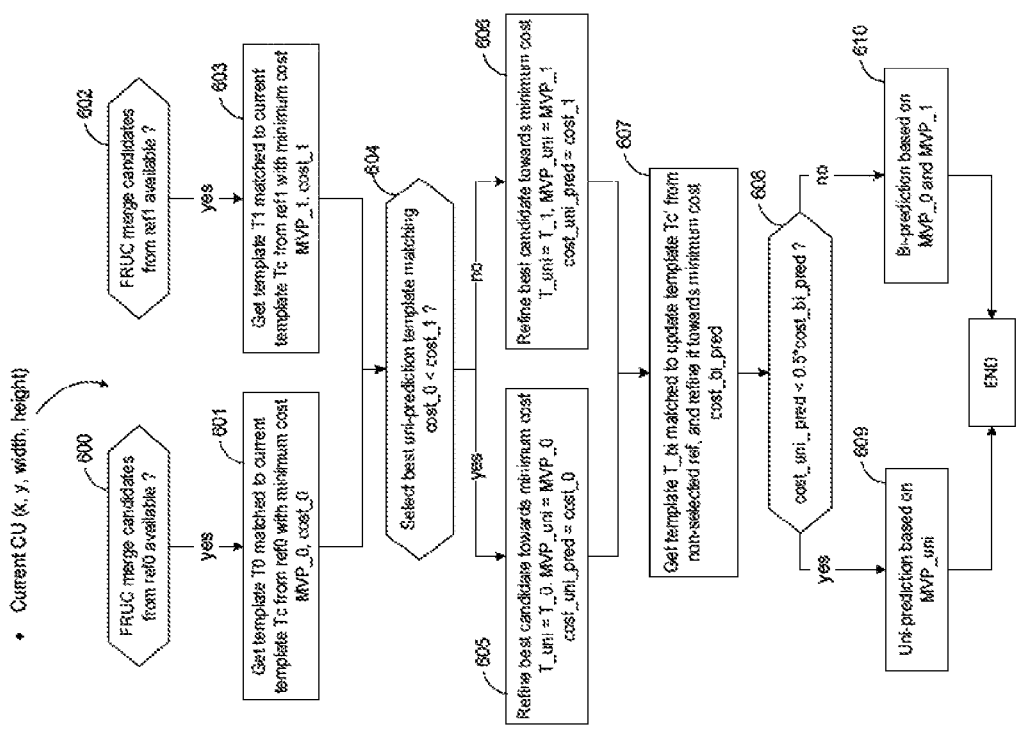
FIG. 9 illustrates selection between uni-prediction and bi-prediction for motion compensation in FRUC template matching.

In FRUC template matching mode, the matched template is searched from list0 reference pictures (ref)) and list1 reference pictures (ref1), respectively. This is a kind of uni-directional template matching since only one list of reference pictures is utilized at a time during each template matching. Such an uni-directional template matching is suitable to derive motion information for uni-prediction instead of bi-prediction. Therefore, for bi-prediction in the existing FRUC template matching mode, a joint bi-directional template matching tool [4] can be activated for better refining the template between uni-prediction and bi-prediction. Flowchart of activating this joint bi-prediction template matching tool is illustrated in FIG. 9.

In the state-of-art, enabling or disabling the IC tool is decided by a loop on IC flag as shown at steps S305 and S306 in FIG. 6. Therefore, only one predefined IC flag from the current CU will be applied to calculate the template matching cost, and also process the following motion compensation. As proposed earlier, there is no IC flag loop to test in this proposed IC flag embodiment. If the uni-direction for motion compensation prediction is selected at step S609 based on template matching distortion, the IC flag of the selected MVP can be used for the template matching cost motion compensation. Otherwise, apply the bi-prediction based on a pair of MVP candidates {MVP_0, MVP_1} (S610), which is constructed from the two motion compensated references (ref0 and ref1). The bi-directional predictor sometimes contains two different IC flags.

Figure 10:
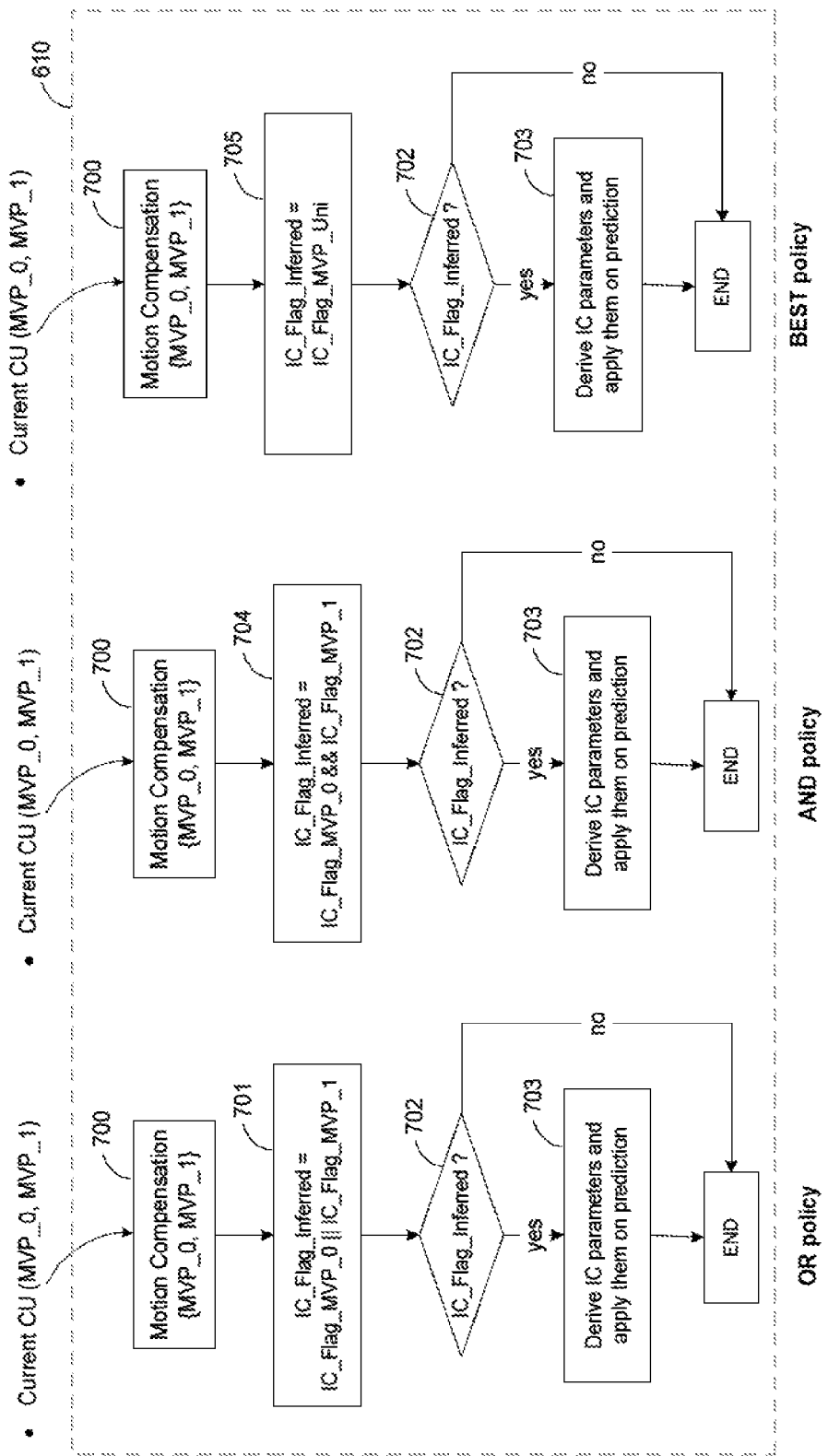
FIG. 10 illustrates IC flag derivation from two reference lists when bi-direction for motion compensation prediction is applied.

Therefore, the second embodiment proposes how to infer the IC flag of the current CU from the two motion compensated references when bi-prediction is applied. The OR policy and AND policy proposed in the first embodiment can be reused similarly. Moreover, the inferred IC flag can also be set to the IC flag value of the MVP with minimum uni-prediction template matching cost (namely BEST policy) as shown in step S705 on the right side of FIG. 10.

According to some aspects of the two embodiments mentioned above, the IC flag of the CU can be derived from its neighboring blocks, rather than signaling it. However, only one inferred IC flag decides to active the IC tool or not when bi-direction for motion compensation is applied, as mentioned in an aforementioned paragraph. If the IC flag in one MVP is not identical to the inferred IC flag value, the optimal motion compensation prediction with this MVP may not be processed. To avoid this potential risk of performance decrement, the third embodiment proposes to keep two IC flags for bi-directional motion compensation.

Figure 11:
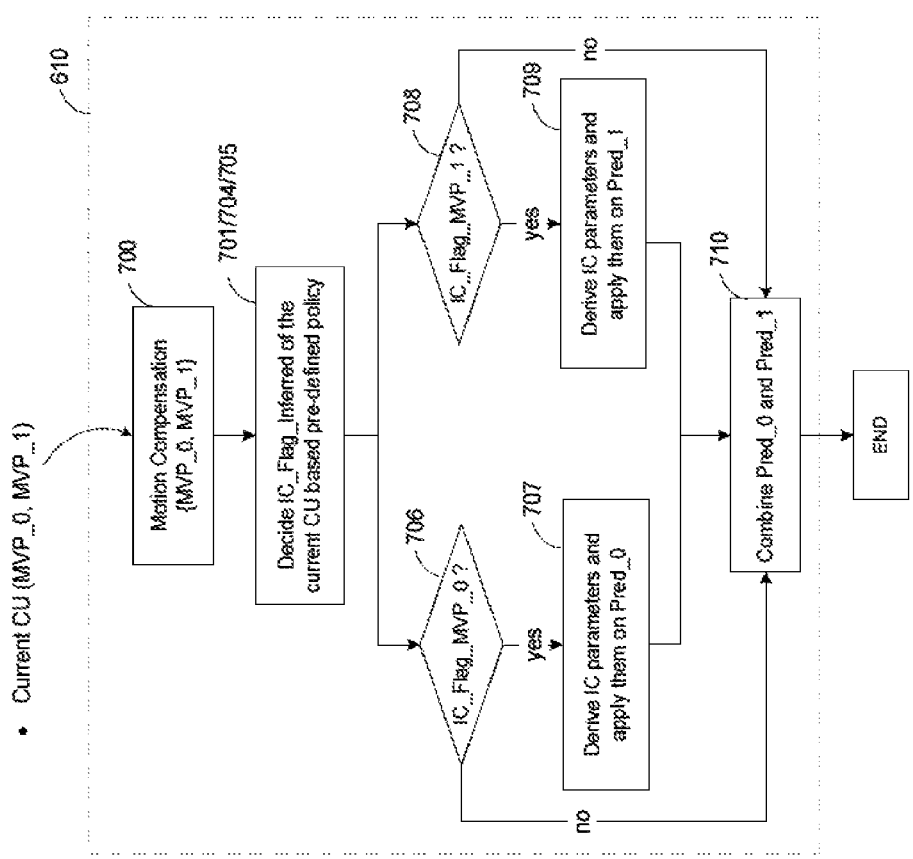
FIG. 11 illustrates IC flag derivation from two reference lists when bi-direction for motion compensation prediction is applied.

The motion information, including the IC flag, for each FRUC merge candidate can be derived at the decoder side. Instead of using the inferred IC flag of the current CU at step S702, motion compensation with each MVP can be performed with its corresponding IC flag respectively as depicted in FIG. 11. For the MVP candidate from ref0 (MVP_0), its IC flag is checked at step S706. If the IC flag of MVP_0 is true, the IC tool is activated for the motion compensation with MVP_0 (S707). The similar processes are performed for the MVP candidate from ref1 (MVP_1) at steps S708 and S709 parallelly.

According to a variant, the proposed IC flag derivation from the neighboring blocks in FRUC template matching mode is performed for the IC flag of the CU using INTER mode.

According to another variant, the IC tool may be activated for the CU with affine model. And the proposed IC flag derivation from the neighboring blocks in FRUC template matching mode is performed for the IC flag of this CU.

According to another variant, the IC tool may be activated for the CU in FRUC bilateral matching mode. And the proposed IC flag derivation from the neighboring blocks in FRUC template matching mode is performed for the IC flag of this CU.

Figure 12:
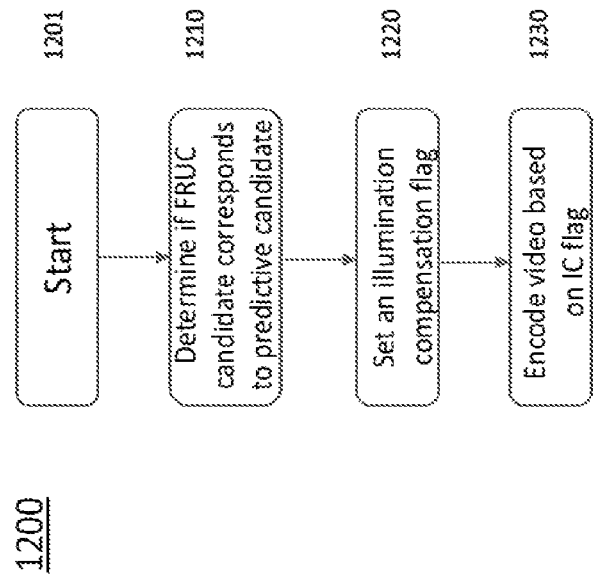
FIG. 12 illustrates one embodiment of a method for encoding video using at least one inferred illumination compensation flag.

One embodiment of a method 1200 for decoding a portion of a video image using illumination compensation is shown in FIG. 12. The method commences at Start block 1201 and proceeds to block 1210 for determining whether a FRUC prediction candidate of a video coding block corresponds to bi-direction temporal or bi-predictive candidates. Control proceeds from block 1210 to block 1220 for setting at least one illumination compensation flag based on illumination compensation flags of at least one of the bi-direction temporal or bi-predictive candidates when the FRUC prediction candidate corresponds to the bi-direction temporal or bi-predictive candidates. Control proceeds from block 1220 to block 1230 for encoding a portion of a video image based on the at least one illumination compensation flag.

Figure 13:
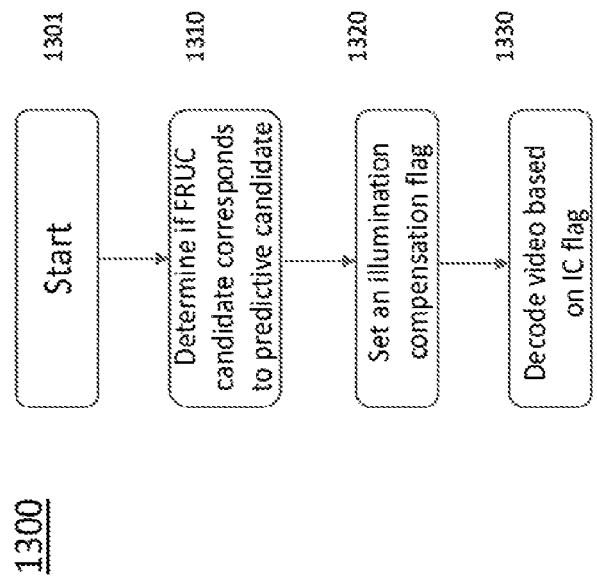
FIG. 13 illustrates one embodiment of a method for decoding video using at least one inferred illumination compensation flag.

One embodiment of a method 1300 for decoding a portion of a video image using illumination compensation is shown in FIG. 13. The method commences at Start block 1301 and proceeds to block 1310 for determining whether a FRUC prediction candidate of a video coding block corresponds to bi-direction temporal or bi-predictive candidates. Control proceeds from block 1310 to block 1320 for setting at least one illumination compensation flag based on illumination compensation flags of at least one of the bi-direction temporal or bi-predictive candidates when the FRUC prediction candidate corresponds to the bi-direction temporal or bi-predictive candidates. Control proceeds from block 1320 to block 1330 for decoding a portion of a video image based on the at least one illumination compensation flag.

One embodiment of an apparatus 1400 for encoding or decoding a block in a video image using illumination compensation is shown in FIG. 14. The apparatus comprises a Processor 1410 and a Memory 1420. The Processor 1410 is configured, for encoding, to perform the steps of FIG. 12, that is performing encoding using illumination compensation for a portion of a video image using the method of FIG. 12.

When Processor 1410 is configured for decoding, it performs the steps of FIG. 13, that is, performing decoding using illumination compensation for a portion of a video image using the method of FIG. 13.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

The present description illustrates the present principles. It will thus be appreciated that those skilled in the art will be able to devise various arrangements that, although not explicitly described or shown herein, embody the present principles and are included within its scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

In conclusion, improved methods and apparatus of performing frame rate up conversion for a portion of a video image are shown by the aforementioned embodiments. In at least one embodiment, an encoder can signal to a decoder whether to use frame rate up conversion for only portions of a video image or a sub-part of a coding unit. In addition, flags are provided to use sub-processes of the frame rate up conversion process in an encoder or a decoder.

The invention claimed is:

1. A method for decoding video information, comprising:
   obtaining a motion vector prediction candidate for a coding block based on template matching;
   obtaining a prediction of the coding block based on the motion vector prediction candidate;
   deriving an illumination compensation indication for the coding block based on an illumination compensation indication associated with the motion vector prediction candidate obtained based on template matching;
   determining to use an illumination compensation for the coding block based on the derived illumination compensation indication associated with the coding block;
   refining the prediction of the coding block using illumination compensation; and
   decoding the coding block based on the refined prediction.

2. The method of claim 1, further comprising:
   obtaining an indication that indicates to use a template matching cost function, wherein the motion vector prediction candidate for the coding block is obtained based on the template matching cost function.

3. The method of claim 1, further comprising:
   determining a template matching cost function, wherein the motion vector prediction candidate for the coding block is obtained based on template matching using the determined template matching cost function.

4. The method of claim 1, wherein obtaining the motion vector prediction candidate for the coding block based on template matching comprises:
   determining a template matching cost function;
   determining cost values for respective candidates in a set of motion vector prediction candidates for the coding block based on the template matching cost function; and
   selecting the motion vector prediction candidate associated with a minimum cost value from the set of motion vector prediction candidates.

5. The method of claim 1, wherein deriving the illumination compensation indication is further based on a neighboring block associated with the motion vector prediction candidate obtained based on template matching, wherein the illumination compensation indication indicates to use illumination compensation to refine the prediction of the coding block by using illumination compensation for the motion vector prediction candidate.

6. The method of claim 1, further comprising:
   determining that an inter-prediction mode is used for the coding block, wherein the deriving of the illumination compensation indication is further based on the determination that the inter-prediction mode is used for the coding block, and wherein the illumination compensation indication indicates to use illumination compensation to refine the prediction of the coding block by using illumination compensation for the motion vector prediction candidate.

7. The method of claim 1, wherein the template matching comprises comparing a first template comprising at least one reconstructed neighboring sample of the coding block to a second template comprising at least one reconstructed neighboring sample of a block in a reference picture corresponding to the coding block.

8. An apparatus for decoding video information, comprising:
   a processor, configured to:
      obtain a motion vector prediction candidate for a coding block based on template matching;
      obtain a prediction of the coding block based on the motion vector prediction candidate;
      derive an illumination compensation indication for the coding block based on an illumination compensation indication associated with the motion vector prediction candidate obtained based on template matching;
      determine to use an illumination compensation for the coding block based on the illumination compensation indication associated with the coding block;
      refine the prediction of the coding block using illumination compensation; and
      decode the coding block based on the refined prediction.

9. The apparatus of claim 8, wherein the processor is further configured to:
   obtain an indication that indicates to use a template matching cost function, wherein the motion vector prediction candidate for the coding block is obtained based on the template matching cost function.

10. The apparatus of claim 8, wherein the processor is further configured to:
    determine a template matching cost function, wherein the motion vector prediction candidate for the coding block is obtained based on template matching using the determined template matching cost function.

11. The apparatus of claim 8, wherein the processor is further configured to:
    determine a template matching cost function,
    determine cost values for respective candidates in a set of motion vector prediction candidates for the coding block based on the template matching cost function, and
    select the motion vector prediction candidate associated with a minimum cost value from the set of motion vector prediction candidates.

12. The apparatus of claim 8, wherein the derivation of the illumination compensation indication is further based on a neighboring block associated with the motion vector prediction candidate obtained based on template matching, wherein the illumination compensation indication indicates to use illumination compensation to refine the prediction of the coding block by using illumination compensation for the motion vector prediction candidate.

13. The apparatus of claim 8, wherein the processor is further configured to:
    determine that an inter prediction mode is used for the coding block, wherein the derivation of the illumination compensation indication is further based on the determination that the inter prediction mode is used for the coding block, and wherein the illumination compensation indication indicates to use illumination compensation to refine the prediction of the coding block by using illumination compensation for the motion vector prediction candidate.

14. The apparatus of claim 8, wherein the template matching comprises comparing a first template comprising at least one reconstructed neighboring sample of the coding block to a second template comprising at least one reconstructed neighboring sample of a block in a reference picture corresponding to the coding block.

15. A non-transitory computer-readable medium storing instructions that when executed by a processor cause it to perform:
- obtaining a motion vector prediction candidate for a coding block based on template matching;
- obtaining a prediction of the coding block based on the motion vector prediction candidate;
- derive an illumination compensation indication for the coding block based on an illumination compensation indication associated with the motion vector prediction candidate obtained based on template matching;
- determining to use an illumination compensation for the coding block based on the illumination compensation indication associated with the coding block;
- refining the prediction of the coding block using illumination compensation; and
- decoding the coding block based on the refined prediction.

16. The non-transitory computer-readable medium of claim 15, further storing instructions that when executed by the processor cause it to perform:
- obtaining an indication that indicates to use a template matching cost function, wherein the motion vector prediction candidate for the coding block is obtained based on the template matching cost function.

17. The non-transitory computer-readable medium of claim 15, further storing instructions that when executed by the processor cause it to perform:
- determining a template matching cost function, wherein the motion vector prediction candidate for the coding block is obtained based on template matching using the determined template matching cost function.

18. The non-transitory computer-readable medium of claim 15, further storing instructions that when executed by the processor cause it to perform:
- determining a template matching cost function;
- determining cost values for respective candidates in a set of motion vector prediction candidates for the coding block based on the template matching cost function; and
- selecting the motion vector prediction candidate associated with a minimum cost value from the set of motion vector prediction candidates.

19. The non-transitory computer-readable medium of claim 15,
- wherein the derivation of the illumination compensation indication is further based on a neighboring block associated with the motion vector prediction candidate obtained based on template matching or further based on a determination that an inter-prediction mode is used for the coding block, wherein the illumination compensation indication indicates to use illumination compensation to refine the prediction of the coding block by using illumination compensation for the motion vector prediction candidate.

20. The non-transitory computer-readable medium of claim 15, wherein the template matching comprises comparing a first template comprising at least one reconstructed neighboring sample of the coding block to a second template comprising at least one reconstructed neighboring sample of a block in a reference picture corresponding to the coding block.

* * * * *